United States Patent
Jung et al.

(10) Patent No.: US 9,955,336 B2
(45) Date of Patent: Apr. 24, 2018

(54) METHOD FOR TRANSMITTING/RECEIVING DISCOVERY SIGNALS IN D2D COMMUNICATION AND DEVICES FOR SUPPORTING SAME

(71) Applicant: LG ELECTRONICS INC., Seoul (KR)

(72) Inventors: Sunghoon Jung, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 15/025,092

(22) PCT Filed: Sep. 25, 2014

(86) PCT No.: PCT/KR2014/008970
§ 371 (c)(1),
(2) Date: Mar. 25, 2016

(87) PCT Pub. No.: WO2015/046918
PCT Pub. Date: Apr. 2, 2015

(65) Prior Publication Data
US 2016/0242022 A1  Aug. 18, 2016

Related U.S. Application Data

(60) Provisional application No. 61/882,582, filed on Sep. 25, 2013.

(51) Int. Cl.
*H04W 8/00* (2009.01)
*H04W 48/16* (2009.01)
*H04W 76/02* (2009.01)

(52) U.S. Cl.
CPC .......... *H04W 8/005* (2013.01); *H04W 48/16* (2013.01); *H04W 76/023* (2013.01)

(58) Field of Classification Search
None
See application file for complete search history.

(56) References Cited

U.S. PATENT DOCUMENTS

| 9,713,072 B2* | 7/2017 | Liao .................. H04W 48/14 |
| 2011/0172741 A1* | 7/2011 | Roberts .............. A61N 1/37217 607/60 |
| 2012/0011247 A1* | 1/2012 | Mallik ................. H04W 8/005 709/224 |
| 2013/0107831 A1 | 5/2013 | Han et al. |

(Continued)

FOREIGN PATENT DOCUMENTS

KR  10-2013-0046748 A  5/2013

OTHER PUBLICATIONS

Lott et al., "D2D—Time has Come for Proximity-based Applications", DOCOMO Euro-Labs, Sep. 20, 2013, 24 pages.

*Primary Examiner* — Hicham Foud
(74) *Attorney, Agent, or Firm* — Birch, Stewart, Kolasch & Birch, LLP

(57) ABSTRACT

Provided are a method for transmitting/receiving discovery signals in a wireless communication system and user equipment for supporting same. The method involves receiving a discovery request signal from user equipment, and determining whether or not to transmit a discovery response signal in response to the discovery request signal on the basis of the determination of the validity of proximity of the user equipment.

10 Claims, 11 Drawing Sheets

(56) References Cited

U.S. PATENT DOCUMENTS

| | | | |
|---|---|---|---|
| 2013/0203378 A1 | 8/2013 | Vos et al. | |
| 2014/0056220 A1* | 2/2014 | Poitau | H04W 40/246 |
| | | | 370/328 |
| 2014/0213186 A1* | 7/2014 | Gage | H04W 4/023 |
| | | | 455/41.2 |
| 2014/0302784 A1* | 10/2014 | Kim | H04W 8/005 |
| | | | 455/41.2 |
| 2014/0378123 A1* | 12/2014 | Stojanovski | H04W 52/0251 |
| | | | 455/422.1 |
| 2016/0157056 A1* | 6/2016 | Kim | H04W 4/023 |
| | | | 455/414.1 |

* cited by examiner

METHOD FOR TRANSMITTING/RECEIVING DISCOVERY SIGNALS IN D2D COMMUNICATION AND DEVICES FOR SUPPORTING SAME

CROSS REFERENCE TO RELATED APPLICATIONS

This application is the National Phase of PCT International Application No. PCT/KR2014/008970, filed on Sep. 25, 2014, which claims priority under 35 U.S.C. 119(e) to U.S. Provisional Application No. 61/882,582, filed on Sep. 25, 2013, all of which are hereby expressly incorporated by reference into the present application.

BACKGROUND OF THE INVENTION

Field of the invention

The present invention relates to wireless communication and, more particularly, to a method for sending and receiving discovery signals in device to device (D2D) communication and a device supporting the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D communication.

D2D communication may have various advantages in that it is communication between devices in proximity. For example, D2D UE has a high transfer rate and a low delay and may perform data communication. Furthermore, in D2D communication, traffic concentrated on a base station can be distributed. If D2D UE plays the role of a relay, it may also play the role of extending coverage of a base station.

Meanwhile, one of important procedures when D2D communication is performed is to discover another device in proximity. To this end, D2D UE sends a discovery request signal (it may be hereinafter called a discovery request signal), and another D2D UE may send a discovery response signal in response to the discovery request signal.

However, the discovery request signal may be periodically transmitted. If each of all of types of UE sends a discovery response signal whenever a periodic discovery request signal is received, it may cause the unnecessary power consumption of the UE and interference with other UE.

For example, first UE has sent a discovery request signal to second UE, that is, a target, and third UE may send a discovery response signal. The first UE may send the discovery request signal periodically and repeatedly. If the third UE repeatedly sends a discovery response signal whenever the first UE sends a discovery request signal, unnecessary power consumption may be generated for the third UE, and interference with the first UE and the second UE may be generated.

Accordingly, there is a need for a method capable of efficiently sending and receiving discovery signals between devices which will perform D2D communication and a device supporting the same.

SUMMARY OF THE INVENTION

The present invention provides a method capable of efficiently sending and receiving discovery signals between devices which will perform D2D communication and a device supporting the same.

In an aspect, a method for sending and receiving discovery signals in a wireless communication system is provided. The method comprises receiving a discovery request signal from user equipment and determining whether or not to send a discovery response signal as a response to the discovery request signal based on a determination of a validity of proximity for the user equipment.

The discovery response signal is transmitted if the validity of proximity for the user equipment is determined to be not valid.

The discovery response signal is not transmitted if the validity of proximity for the user equipment is determined to be valid.

The validity of proximity for the user equipment is determined by comparing a time interval from a point of time at which the discovery request signal has been received to a point of time at which the validity of proximity has been determined with a threshold.

The time interval is measured by a timer.

The method further comprises receiving a first discovery request signal, sending a first discovery response signal as a response to the first discovery request signal, and receiving a discovery check signal as a response to the first discovery response signal.

The validity of proximity for the user equipment is determined by comparing a time interval from a point of time at which the discovery check signal has been received to a point of time at which the validity of proximity has been determined with a threshold.

The time interval is measured by a timer.

In another aspect, a user equipment sending and receiving discovery signals in a wireless communication system is provided. The user equipment comprises a radio frequency (RF) unit sending and receiving radio signals and a processor coupled to the RF unit, wherein the processor receives a discovery request signal from user equipment and determines whether or not to send a discovery response signal as a response to the discovery request signal based on a determination of a validity of proximity for the user equipment.

Discovery signals can be efficiently transmitted and received between devices which will perform D2D communication.

DESCRIPTION OF EXEMPLARY EMBODIMENTS

Figure 1:
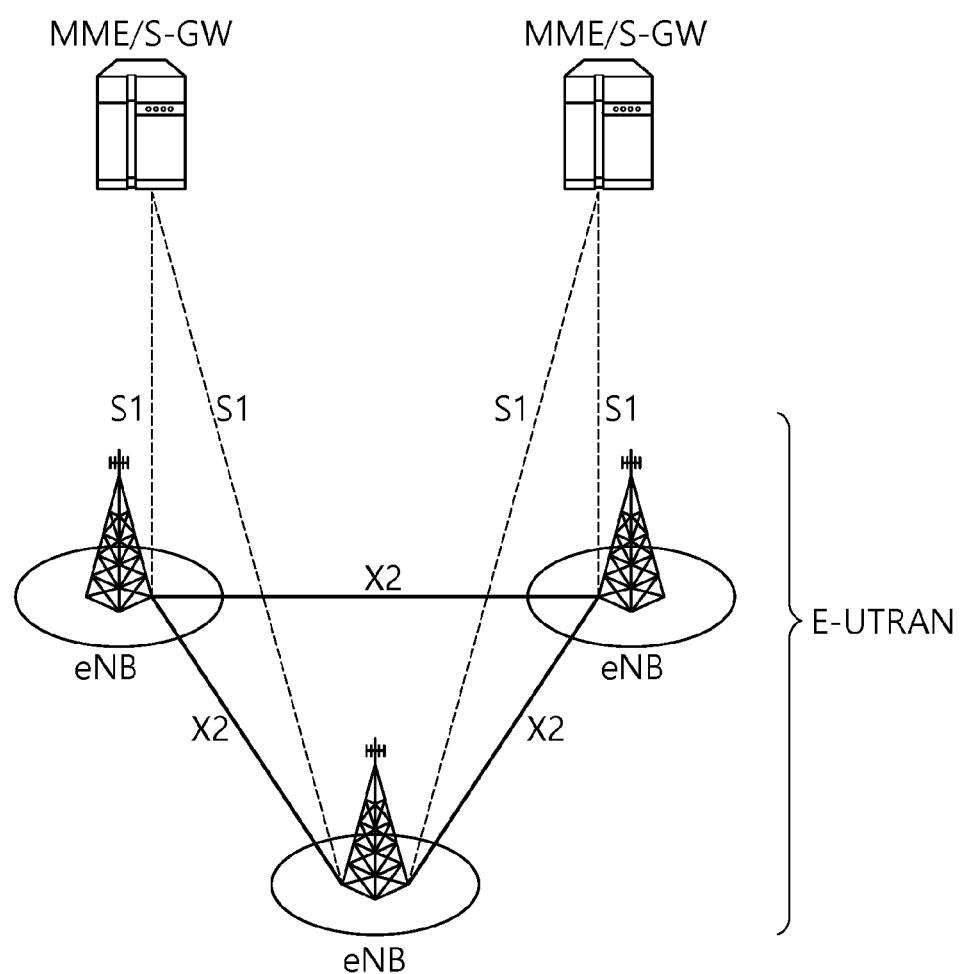
FIG. 1 is a diagram showing the network configuration of an Evolved Universal Terrestrial Radio Access Network (E-UTRAN) which is an example of a mobile communication system.

FIG. 1 is a diagram showing the network configuration of an Evolved Universal Terrestrial Radio Access Network (E-UTRAN) which is an example of a mobile communication system. The E-UTRAN system is a system evolved from an existing UTRAN system. In 3GPP, a basic standardization task for the E-UTRAN system is in progress. The E-UTRAN system is also called a Long Term Evolution (LTE) system.

An E-UTRAN includes e-NodeBs (eNBs or base stations). The eNBs are connected through X2 interfaces. The eNB is connected to User Equipment (hereinafter abbreviated as UE) through a radio interface and connected to an Evolved Packet Core (EPC) through an S1 interface.

The EPC consists of a Mobility Management Entity (MME), a Serving-Gateway (S-GW), and a Packet Data Network-Gateway (PDN-GW). The MME has information about the access of UE and information about the capability of UE. Such information is chiefly used in the mobility management of UE. The S-GW is a gateway having the E-UTRAN as an end point. The PDN-GW is a gateway having the PDN as an end point.

The layers of a radio interface protocol between UE and the network may be divided into L1 (a first layer), L2 (a second layer), and L3 (a third layer) based on the lower 3 layers of an Open System Interconnection (OSI) reference model which is widely known in communication systems. A physical layer that belongs to the lower 3 layers and belongs to the first layer provides information transfer services using physical channels. A Radio Resource Control (hereinafter abbreviated as RRC) layer that belongs to the lower 3 layers and is placed in the third layer functions to control radio resources between UE and the network. To this end, the RRC layer exchanges RRC messages between the UE and the eNB.

Figure 2:
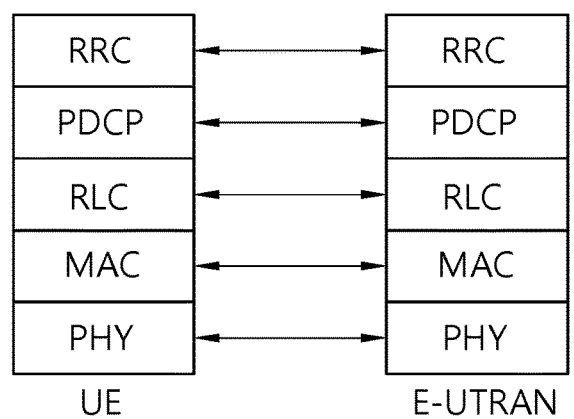
FIG. 2 is a layers of the control plane of the radio protocol
Figure 3:
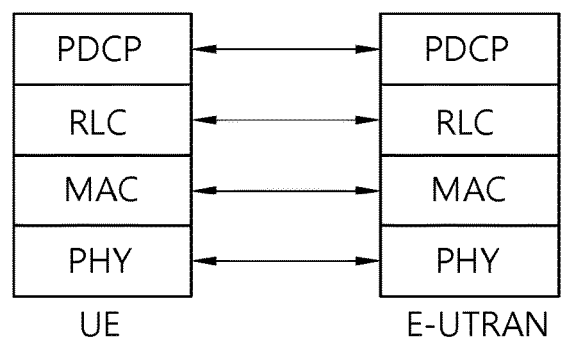
FIG. 3 is a user plane of the radio protocol.

FIGS. 2 and 3 show the structure of a radio interface protocol between UE and the E-UTRAN, which is based on a 3GPP radio access network standard.

The radio interface protocol includes a physical layer, a data link layer, and a network layer horizontally and is divided into a user plane (U-plane) for transmitting data information and a control plane (C-plane) for transferring control signal (signaling) vertically. The protocol layers of FIGS. 2 and 3 may be divided into L1 (a first layer), L2 (a second layer), and L3 (a third layer) based on the lower 3 layers of an Open System Interconnection (OSI) reference model which is widely known in communication systems. Such radio protocol layers are present in pairs in UE and the E-UTRAN and responsible for the data transfer of a radio section.

The layers of the control plane of the radio protocol in FIG. 2 and the user plane of the radio protocol in FIG. 3 are described below.

The physical layer, that is, the first layer, provides a higher layer with an information transfer service using a physical channel. The physical layer is connected to a higher medium access control layer through a transport channel, and data is moved between the medium access control layer and the physical layer through the transport channel. Furthermore, data is moved through the physical channel between different physical layers, that is, the physical layers of the transmission side and the reception side. The physical channel is modulated according to an Orthogonal Frequency Division Multiplexing (OFDM) method and uses the time and frequency as radio resources.

The Medium Access Control (hereinafter abbreviated as MAC) of the second layer provides service to a radio link control layer, that is, a higher layer, through a logical channel. The Radio Link Control (hereinafter abbreviated as RLC) layer of the second layer supports the transmission of reliable data. The functions of the RLC layer may be implemented as functional blocks within the MAC. In this case, the RLC layer may not be present. The PDCP layer of the second layer performs a header compression function for reducing the size of an IP packet header which has a relatively large size and includes unnecessary control information in order to efficiently send an IP packet, such as IPv4 or IPv6, in a radio section having a small bandwidth when sending the IP packet.

A radio resource control (hereinafter abbreviated as RRC) layer placed at the top of the third layer is defined in the control plane only and responsible for control of logical channel, transport channels, and physical channels in relation to the configuration, re-configuration, and release of Radio Bearers (abbreviated as RBs). In this case, the RB means a service provided by the second layer for the transfer of data between UE and the UTRAN. If RRC connection is present between the RRC of UE and the RRC layer of a radio network, the UE is in the RRC_CONNECTED state. If not, the UE is in the RRC_IDLE state.

A downlink transport channel for sending data from a network to UE includes a Broadcast Channel (BCH) for sending system information and a downlink Shared Channel (SCH) for sending user traffic or a control message. Downlink multicast or the traffic or control message of a broadcast service may be transmitted through the downlink SCH or may be transmitted through a separate downlink Multicast Channel (MCH). Meanwhile, an uplink transport channel for sending data from UE to a network includes a Random Access Channel (RACH) for sending an initial control message and an uplink Shared Channel (SCH) for sending user traffic or a control message.

A logical channel placed over a transport channel and mapped to the transport channel includes a Broadcast Channel (BCCH), a Paging Control Channel (PCCH), a Common Control Channel (CCCH), a Multicast Control Channel (MCCH), a Multicast Traffic Channel (MTCH) and so on.

A physical channel includes several subframes on a time axis and several subcarriers on a frequency axis. In this case, one subframe includes a plurality of symbols on the time axis. One subframe includes a plurality of resource blocks. One resource block includes a plurality of symbols and a plurality of subcarriers. Furthermore, each subframe may use specific subcarriers of specific symbols (e.g., the first symbol) of the corresponding subframe for a Physical Downlink Control Channel (PDCCH), that is, an L1/L2 control channel. One subframe may include two slots having a length of 0.5 ms, which may correspond to 1 ms corresponding to a Transmission Time Interval (TTI), that is, a unit time in which data is transmitted.

Proximity services (ProSe) are described below.

The ProSe is a concept which may include D2D communication. Hereinafter, the ProSe may be interchangeably used along with D2D.

ProSe direct communication refers to communication performed between two or more types of adjacent UE. The types of UE may perform communication using the protocol of the user plane. ProSe-enabled UE means UE supporting a procedure related to the requirements of ProSe. Unless otherwise described, the ProSe-enabled UE includes both public safety UE and non-public safety UE. The public safety UE is UE supporting both a function specified for public safety and a ProSe process. The non-public safety UE is UE supporting a ProSe process, but not supporting a function specified for public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Figure 4:
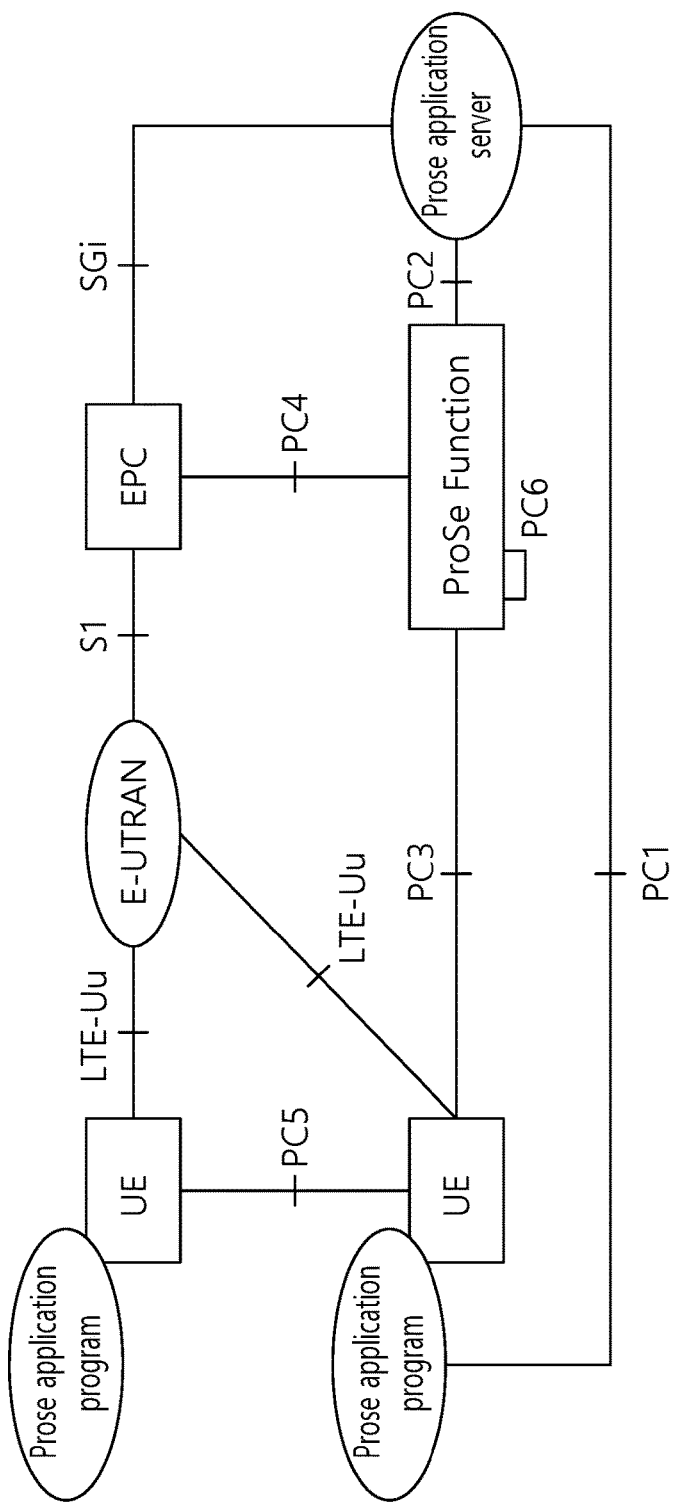
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

Figure 5:
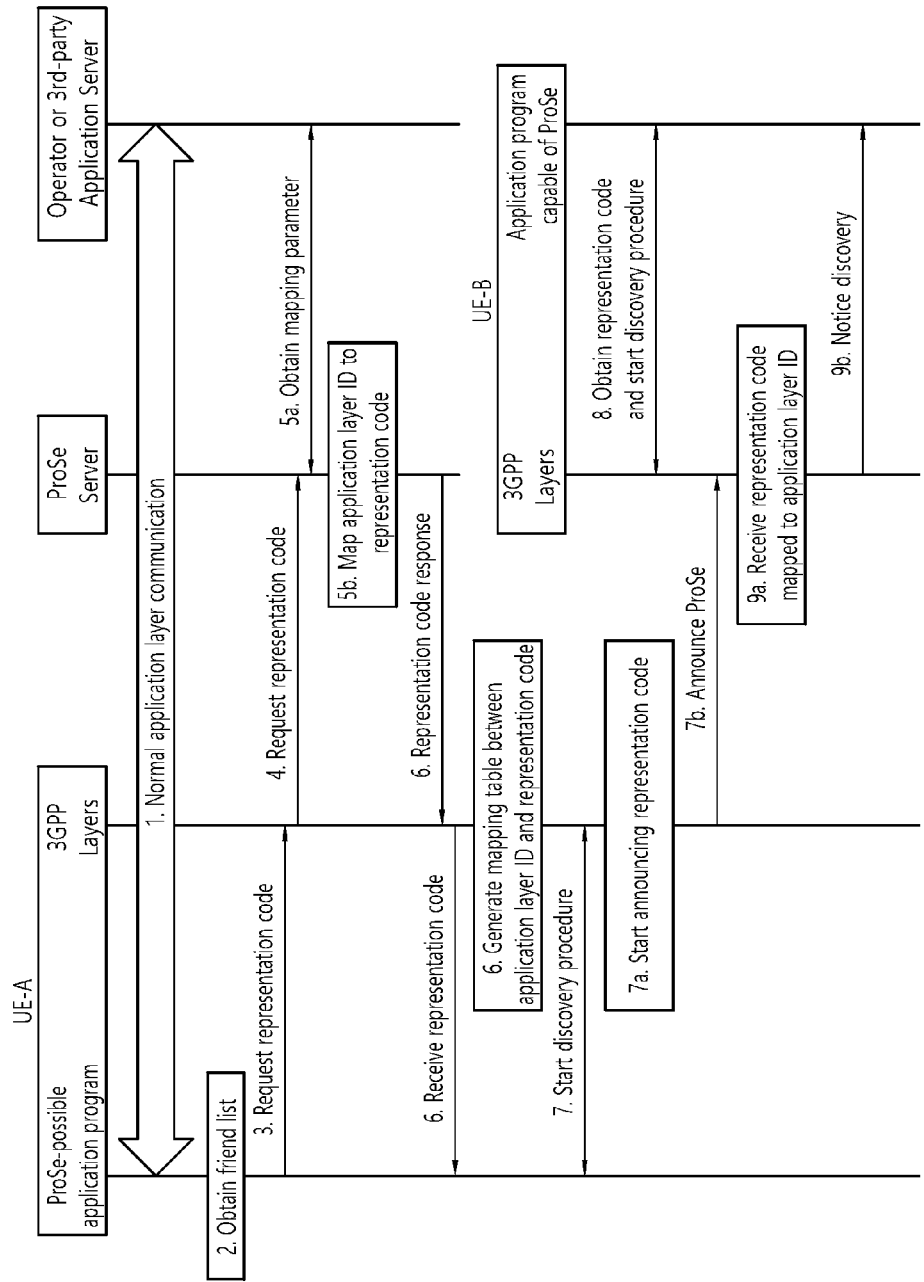
FIG. 5 is an embodiment of a ProSe discovery process.

FIG. 5 is an embodiment of a ProSe discovery process.

Referring to FIG. 5, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 5, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 5 may also be called a single step discovery procedure.

Figure 6:
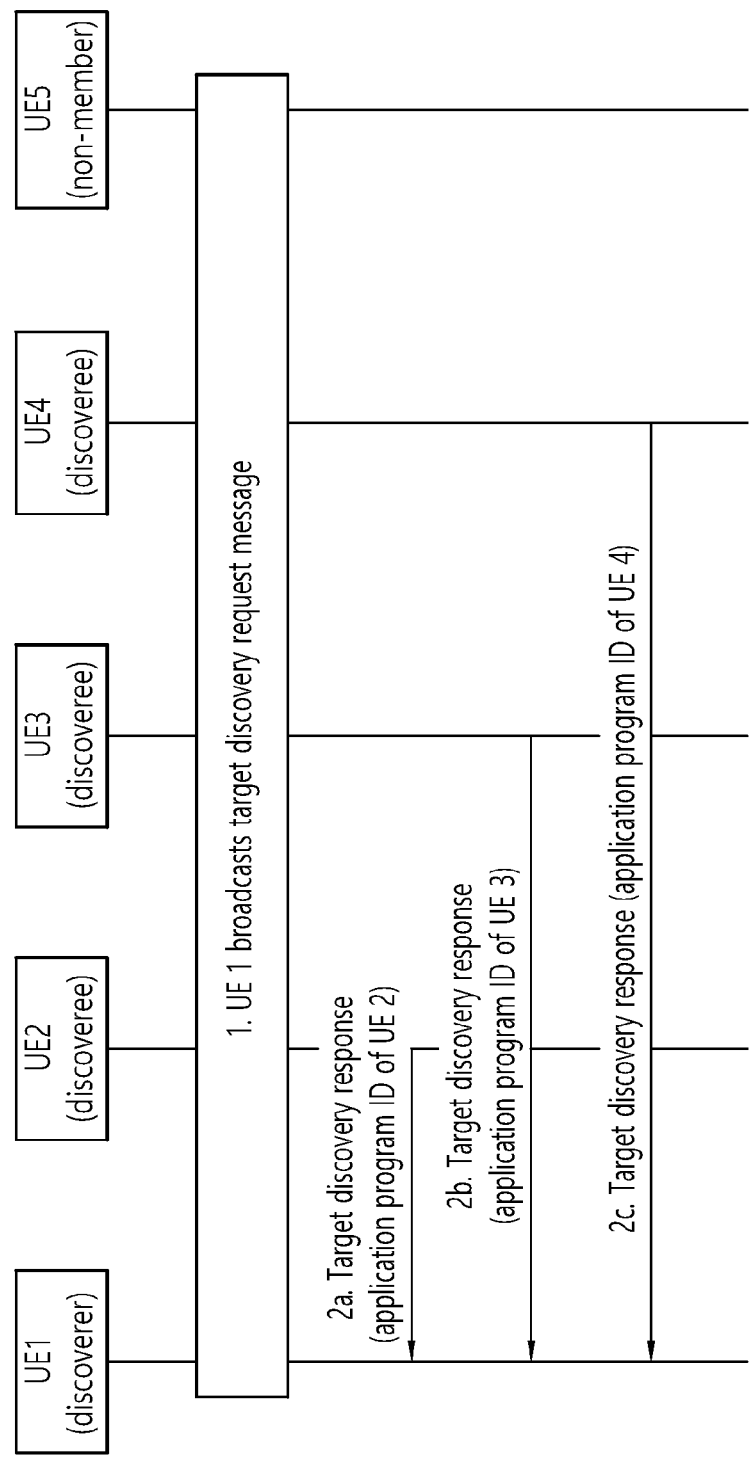
FIG. 6 is another embodiment of the ProSe discovery process.

FIG. 6 is another embodiment of the ProSe discovery process.

In FIG. 6, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 6 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 6 may be called a 2-step discovery procedure.

In addition to the discovery procedure described in FIG. 6, if the UE 1 (the discoverer) sends a discovery conform message (may be hereinafter abbreviated as an M3), that is, a response to the target discovery response message, this may be called a 3-step discovery procedure.

Meanwhile, in FIG. 6, the UE 1 may repeatedly send the discovery request message. In this case, the UE 2 to the UE 4 may need to repeatedly send the discovery response messages. Such an operation may not be preferred. For example, the UE 1 discovers the UE 2 and attempts to perform D2D communication. In this case, there are problems in that the discovery response messages transmitted by the UE 3 and the UE 4 may become interference and they cause unnecessary power consumption for the UE 3 and the UE 4.

For another example, if the UE 1 has not received a discovery response message from the UE 3 and repeatedly sends a discovery request message, the UE 2 and the UE 4 may not need to send discovery response messages unnecessarily and repeatedly in response to the discovery request message of the UE 1.

In order to solve such a problem, in the present invention, the concept of the validity of proximity is to be introduced into ProSe communication.

The validity of proximity is for determining whether counterpart UE is in proximity in D2D communication. Once a result of the determination of the validity of proximity is determined to be valid, the result of the determination of the validity of proximity continues to be determined to be valid as long as a valid condition is satisfied. The validity of proximity may be considered and used in both types of UE performing D2D communication.

UE may determine whether or not to send a discovery response message based on the validity of proximity. Furthermore, UE may use the validity of proximity when it determines whether UE previously determined to be in proximity is still in proximity.

A method for performing a discovery process using the validity of proximity is described below.

Figure 7:
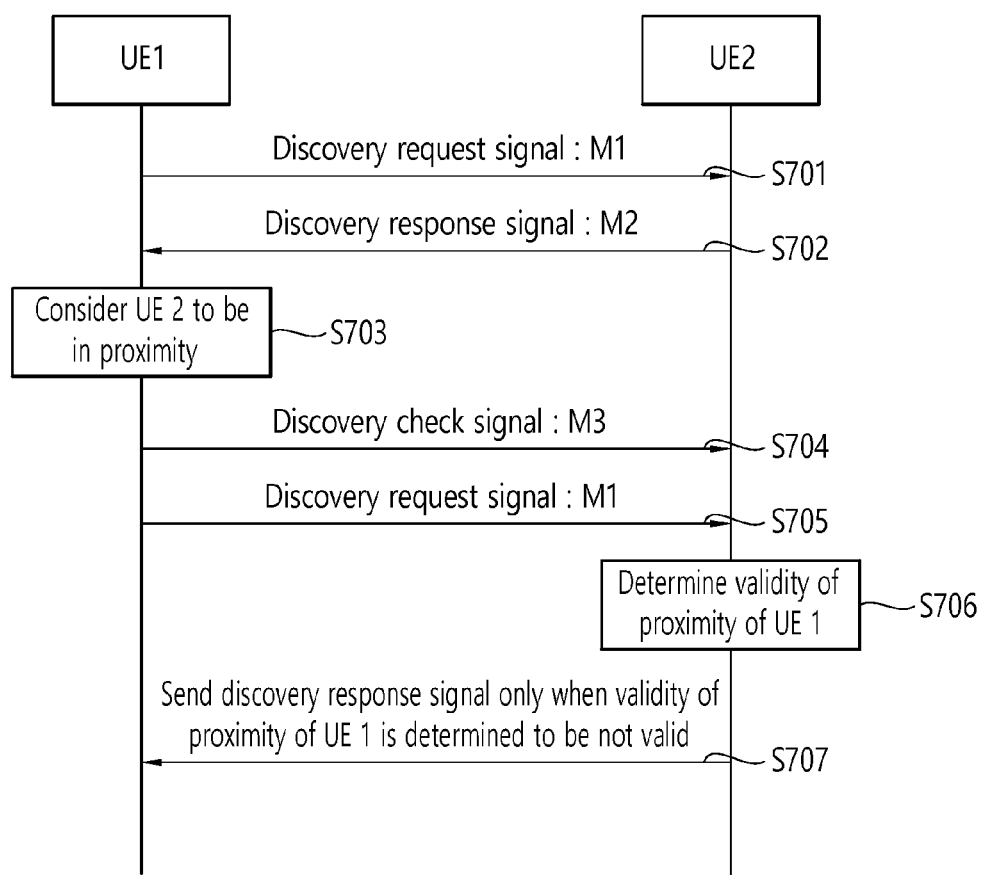
FIG. 7 shows a discovery process according to an embodiment of the present invention.

FIG. 7 shows a discovery process according to an embodiment of the present invention.

UE 1 sends a discovery request signal (message) (S701).

The discovery request signal may be broadcasted. As a result, pieces of UE within a proper range may receive the discovery request signal at the same time.

The discovery request signal may be periodically transmitted. The discovery request signal may have been transmitted as a response to another discovery request signal. For example, the same is true when a discovery request signal and a discovery response signal use the same format.

Alternatively, the discovery request signal may be transmitted in response to a request from a higher layer, a request from a user, or a request from an application program.

UE 2 receives the discovery request signal and sends a discovery response signal as a response to the discovery request signal (S702). In FIG. 7, only the UE 2 has been illustrated, but a plurality of types of UE may send discovery response signals.

The UE 1 considers that the UE 2 is in proximity based on the discovery response signal received from the UE 2 (S703).

The UE 1 may send a discovery check signal (S704).

The UE 1 sends a discovery request signal again (S705). In the discovery process, a discovery request signal may be transmitted repeatedly and periodically as described above because reliability and certainty are not guaranteed by the transmission of one discovery request signal. The retransmitted discovery request signal may also be broadcasted and may include characteristics described at S701.

When the UE 2 receives the discovery request signal transmitted by the UE 1, the UE 2 determines the validity of proximity of the UE 1 (S706). A method for determining the validity of proximity is described later.

The UE 2 sends a discovery response signal only when the validity of proximity of the UE 1 is determined to be not valid (S707). In other words, if the UE 2 determines the validity of proximity of the UE 1 to be still valid, the UE 2 does not send the discovery response signal. In contrast, if the validity of proximity of the UE 1 is determined to be not valid, the UE 2 sends the discovery response signal.

Meanwhile, in FIG. 7, an example in which only the UE 2 determines the validity of proximity of the UE 1 has been described, but this is not limited. That is, the UE 1 may also determine the validity of proximity of the UE 2.

Figure 8:
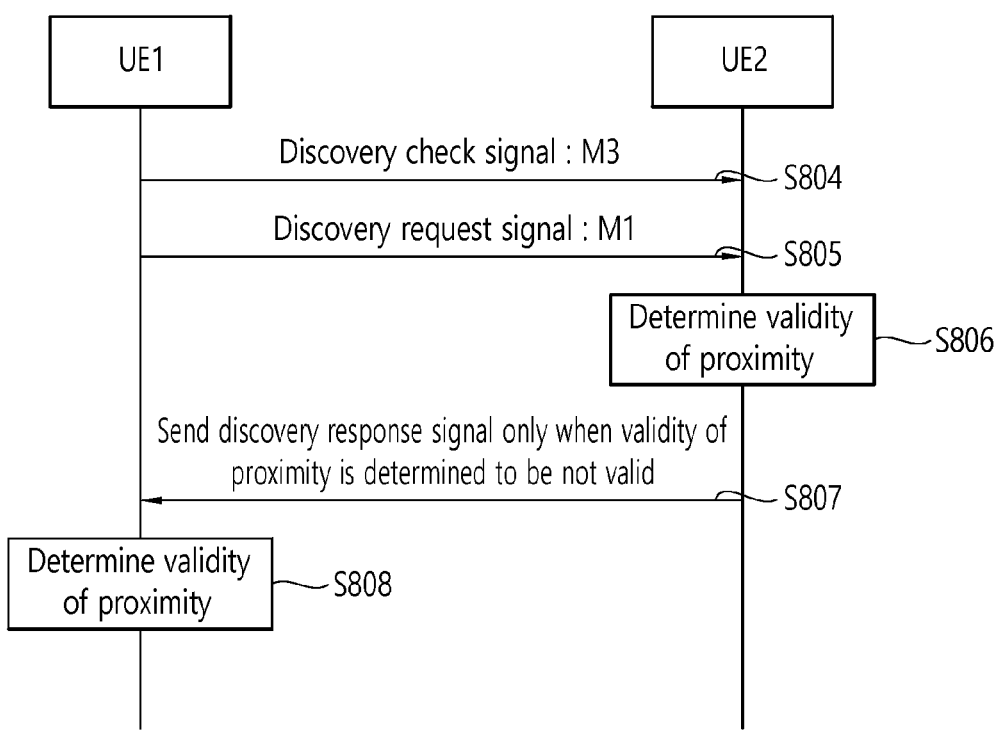
FIG. 8 shows a discovery process according to another embodiment of the present invention.

FIG. 8 shows a discovery process according to another embodiment of the present invention.

Referring to FIG. 8, UE 1 and UE 2 may perform steps S804 to S807 after performing steps S701 to S703 of FIG. 7 likewise. Steps S804 to S807 are the same as steps S704 to S707.

When the UE 1 receives a discovery response signal transmitted by the UE 2, the UE 1 may determine the validity of proximity of the UE 2 (S808).

If the validity of proximity of the UE 2 is determined to be valid, the UE 1 considers that the UE 2 is still in proximity to the UE 1 although the discovery response signal of S808 is not a response to a discovery request signal that has been transmitted most recently.

If the validity of proximity of the UE 2 is determined to be not valid, the UE 1 considers that the UE 2 is not in proximity to the UE 1 until it receives a discovery request signal or discovery response signal from the UE 2 after the determination.

A method for determining the validity of proximity is described below.

1. If a 2-step or 3-step discovery procedure is used.

1) A determination criterion for the UE 2.

Figure 9:
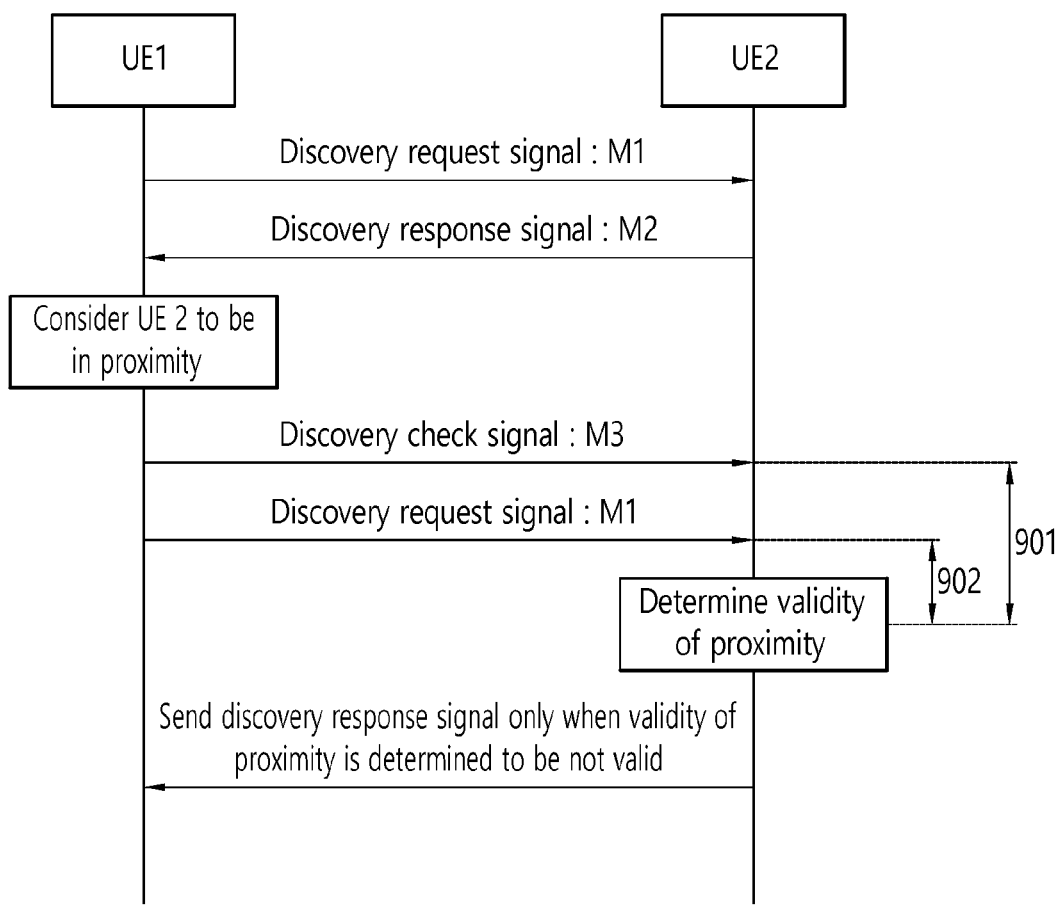
FIG. 9 shows a time interval that needs to be measured by the UE 2.

FIG. 9 shows a time interval that needs to be measured by the UE 2.

First, the UE 2 measures i) a time interval 901 from the moment when a discovery response transmitted by the UE 2 has been successfully received by the UE 1 to a point of time at which the UE 2 has determined the validity of proximity of the UE 1 or ii) a time interval 902 from the moment when the most recent discovery request signal has been received from the UE 1 to a point of time at which the UE 2 has determined the validity of proximity of the UE 1. The UE 2 may be aware that the discovery response signal has been successfully received by the UE 1 at the moment when it receives the discovery check signal from the UE 1 in response to the transmitted discovery response signal.

The UE 2 may determine that the validity of proximity of the UE 1 is not valid if the time interval 901 or 902 is greater than a threshold. In contrast, if the time interval 901 or 902 is the threshold or less, the UE 2 may determine that the validity of proximity of the UE 1 is valid.

The threshold may be a value set by a network or may be a predetermined value.

2) A determination criterion for the UE 1.

Figure 10:
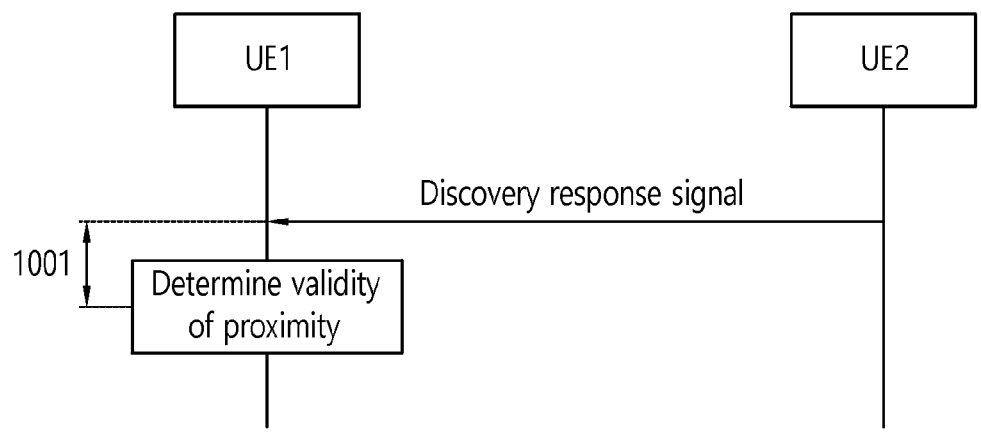
FIG. 10 shows a time interval that needs to be measured by the UE 1.

FIG. 10 shows a time interval that needs to be measured by the UE 1.

The UE 1 measures a time interval 1001 from the moment when the UE 1 has received a discovery response signal from the UE 2 most recently to the moment when the UE 1 has determined the validity of proximity of the UE 2.

If the time interval 1001 is greater than a threshold, the UE 1 may determine that the validity of proximity of the UE 2 is not valid. In contrast, if the time interval 1001 is the threshold or less, the UE 1 may determine that the validity of proximity of the UE 2 is valid. In other words, the UE 1 may determine that the validity of proximity of the UE 2 only until time of the threshold or less elapses from a point of time at which a discovery response signal was received.

The threshold may be a value set by a network or may be a predetermined value.

2. If a single step discovery procedure is used.

UE may compare a time interval from a point of time at which a discovery request signal has been received to a point of time at which the validity of proximity of another UE is determined with a threshold and determine that the validity of proximity of another UE is not valid if the time interval is greater than the threshold. In contrast, if the time interval is the threshold or less, the UE may determine that the validity of proximity of another UE is valid. In other words, the UE determines that the validity of proximity of another UE is valid only until time of the threshold or less elapses from a point of time at which a discovery response signal transmitted by another UE is received.

The threshold may be a value set by a network or may be a predetermined value.

In the above 1 and 2, the time interval may be measured by the driving of a timer. For example, the UE 2 may i) drive the time at the moment when the UE 2 is aware that a discovery response transmitted by the UE 2 has been successfully received by the UE 1 and terminate the timer at a point of time at which a determination of the validity of proximity of the UE 1 is terminated. Alternatively, the UE 2 may drive the timer at the moment when it has received a discovery request signal from the UE 1 most recently and terminate the timer at a point of time at which a determination of the validity of proximity of the UE 1 is terminated.

Meanwhile, in the above 1 and 2, the time interval used to determine the validity of proximity may be scaled depending on the mobility of UE (speed of UE). For example, the time interval may be reduced in the case of UE having high speed, and the time interval may be increased in the case of UE having low speed.

Such scaling may be indicated by the product of the time interval and a scaling factor. The scaling factor may be determined depending on the mobility of UE. That is, the scaling factor of UE having high speed may be given a relatively small value, and the scaling factor of UE having low speed may be given a relatively great value. The scaling factor may be set for each speed interval of UE or may be previously determined.

Figure 11:
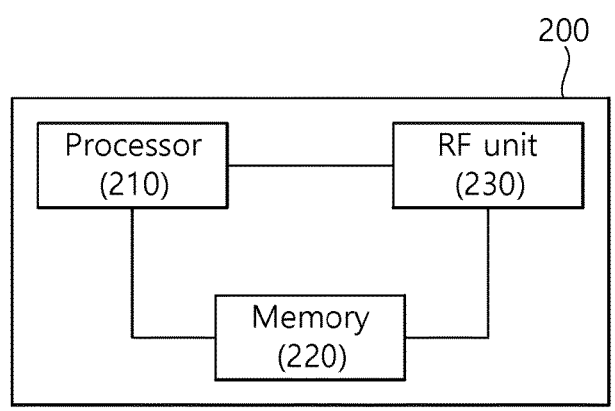
FIG. 11 is a block diagram showing a wireless device in which the embodiments of the present invention are implemented.

FIG. 11 is a block diagram showing a wireless device in which the embodiments of the present invention are implemented.

UE 200 includes a processor 210, memory 220, and an RF unit 230. The processor 210 implements the proposed functions, processes and/or methods. For example, the processor 210 receives a discovery request signal from another UE, that is, the subject of D2D communication, and determines whether or not to send a discovery response signal as a response to the discovery request signal based on a determination of the validity of proximity for another UE. The memory 220 is connected to the processor 210 and stores various types of information for driving the processor 210. The RF unit 230 is connected to the processor 210 and sends and/or receives radio signals.

The processor 110, 210 may include Application-Specific Integrated Circuits (ASICs), other chipsets, logic circuits, data processors and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for sending and/or receiving radio signals. When an embodiment is implemented in software, the aforementioned scheme may be implemented as a module process, function, etc. for performing the aforementioned function. The module may be stored in the memory 120, 220 and executed by the processor 110, 210. The memory 120, 220 may be placed inside or outside the processor 110, 210 and may be connected to the processor 110, 210 by various well-known means.

What is claimed is:

1. A method for transmitting a discovery response signal, in a wireless communication system, the method performed by a first user equipment (UE), which supports a device-to-device (D2D) communication, and comprising:
   receiving, from a second UE which supports the D2D communication, a first discovery request signal;
   transmitting, to the second UE, a first discovery response signal as a response to the first discovery request signal;
   receiving, from the second UE, a discovery check signal as a response to the first discovery response signal;
   receiving, from the second UE, a second discovery request signal;
   determining whether or not to transmit a second discovery response signal to the second UE as a response to the second discovery request signal based on a validity of proximity for the first UE; and
   transmitting the second discovery response signal to the second UE based on the determination when the validity of proximity for the first UE is determined to be not valid,
   wherein the validity of proximity for the first UE is determined based on a time interval between a point of time at which the discovery check signal has been received and a point of time at which the validity of proximity has been determined, and
   wherein the time interval is scaled according to a mobility of the first UE.

2. The method of claim 1, wherein the second discovery response signal is not transmitted when the validity of proximity for the first UE is determined to be valid.

3. The method of claim 1, wherein the time interval is measured by a timer.

4. The method of claim 1, wherein the validity of proximity for the first UE is determined to be valid when the time interval is equal to or less than a threshold.

5. The method of claim 4, wherein the threshold is a predetermined threshold or a threshold determined by a network.

6. The method of claim 4, wherein when the mobility of the first UE is a high mobility, the time interval is scaled down, and
   when the mobility of the first UE is a low mobility, the time interval is scaled up.

7. The method of claim 1, wherein the validity of proximity for the first UE is determined to be not valid when the time interval is larger than a threshold.

8. The method of claim 7, wherein the threshold is a predetermined threshold or a threshold determined by a network.

9. The method of claim 7, wherein when the mobility of the first UE is a high mobility, the time interval is scaled down, and
   when the mobility of the first UE is a low mobility, the time interval is scaled up.

10. A first user equipment (UE) which supports a device-to-device (D2D) communication, the first UE comprising:
    a radio frequency (RF) transceiver configured to transmit and receive radio signals; and
    a processor coupled to the RF transceiver,
    wherein the processor is configured to:
       receive, from a second UE which supports the D2D communication, a first discovery request signal;
       transmit, to the second UE, a first discovery response signal as a response to the first discovery request signal;
       receive, from the second UE, a discovery check signal as a response to the first discovery response signal;
       receive, from the second UE, a second discovery request signal;
       determine whether or not to transmit a second discovery response signal to the second UE as a response to the second discovery request signal based on a validity of proximity for the first UE; and
       transmit the second discovery response signal to the second UE based on the determination when the validity of proximity for the first UE is determined to be not valid,
    wherein the validity of proximity for the first UE is determined based on a time interval between a point of time at which the discovery check signal has been received and a point of time at which the validity of proximity has been determined, and
    wherein the time interval is scaled according to a mobility of the first UE.

* * * * *